United States Patent [19]

Koizumi

[11] Patent Number: 5,414,864

[45] Date of Patent: May 9, 1995

[54] METHOD FOR SELECTIVELY SAVING/RESTORING FIRST REGISTERS AND BYPASSING SECOND REGISTERS IN REGISTER UNITS BASED ON INDIVIDUAL LOCK/UNLOCK STATUS THEREOF

[75] Inventor: Shinobu Koizumi, Sagamihara, Japan

[73] Assignee: Hitachi, Ltd., Tokyo, Japan

[21] Appl. No.: 555,162

[22] Filed: Jul. 19, 1990

[30] Foreign Application Priority Data

Jul. 20, 1989 [JP] Japan .................. 1-189976

[51] Int. Cl.⁶ ............................................. G06F 12/02
[52] U.S. Cl. ...................................... 395/775; 395/425;
364/964.21; 364/964.6; 364/969.2; 364/DIG. 2
[58] Field of Search ................ 395/800, 600, 375, 775,
395/425; 364/200, 933, 933.3, 933.4, 933.5,
933.6, 933.61, 933.62, 933.7

[56] References Cited

U.S. PATENT DOCUMENTS

| | | | |
|---|---|---|---|
| 4,484,274 | 11/1984 | Berenbaum | 395/775 |
| 4,493,020 | 1/1985 | Kim et al. | 364/200 |
| 4,733,346 | 3/1988 | Tanaka | 364/200 |
| 4,777,588 | 10/1988 | Case et al. | 395/800 |
| 4,811,208 | 3/1989 | Myers et al. | 395/800 |
| 4,853,849 | 8/1989 | Bain, Jr. et al. | 364/200 |
| 4,903,196 | 2/1990 | Pomerene et al. | 395/375 |
| 4,945,510 | 7/1990 | Maeda et al. | 395/375 |
| 5,021,993 | 6/1991 | Matoba et al. | 364/900 |

*Primary Examiner*—Thomas C. Lee
*Assistant Examiner*—Sang Hui Kim
*Attorney, Agent, or Firm*—Fay, Sharpe, Beall, Fagan, Minnich & McKee

[57] ABSTRACT

In a data processing system having a central processing unit including a register file for storage of often-used data, a method and system is provided for saving and restoring the contents of the register file from the main memory only when necessary. Each register unit in the register file includes a register protection flag, a save area pointer and a plurality of general purpose registers. The register protection flag is coded to identify if the register unit is in actual use by having contents stored in any of the general purpose registers. Before saving or restoring the register unit, its register protection flag is checked, and only if the flag indicates actual use is the saving or restoring performed.

8 Claims, 10 Drawing Sheets

FIG. 4

| NO. | INSTRUCTION FORMAT ||| OPERATION |
|---|---|---|---|
| | INSTRUCTION CODE | FIRST OPERAND | SECOND OPERAND | |
| 1 | SAVE | REGISTER UNIT NUMBER | — | IF REGISTER UNIT SHOWED IN FIRST OPERAND IS USED, IT IS SAVED. |
| 2 | LOCK | REGISTER UNIT NUMBER | SAVE AREA ADDRESS | DESIGNATING START OF USE OF REGISTER UNIT SHOWED BY FIRST OPERAND. DESIGNATING SAVE AREA BY USING SECOND OPERAND. |
| 3 | RESTORE | REGISTER UNIT NUMBER | SAVE AREA ADDRESS | IF REGISTER UNIT SHOWED IN FIRST OPERAND IS USED, REGISTER UNIT IS RESTORED FROM SAVE AREA SHOWED BY SECOND OPERAND. |
| 4 | UNLOCK | REGISTER UNIT NUMBER | — | DESIGNATING END OF USE OF REGISTER UNIT SHOWED BY FIRST OPERAND. |

METHOD FOR SELECTIVELY SAVING/RESTORING FIRST REGISTERS AND BYPASSING SECOND REGISTERS IN REGISTER UNITS BASED ON INDIVIDUAL LOCK/UNLOCK STATUS THEREOF

BACKGROUND OF THE INVENTION

1. Field of the Invention

The present invention relates to data processing systems and in particular to a system in which a central processing unit has a register file for storage of often-used data to minimize the need for relatively slower accessing of a main memory of the system. More particularly, it relates to the circumstance when contents of the register file have to be saved in a main memory, and then restored therefrom, and a method of minimizing the saving and restoring of the contents of the register file in and from the main memory.

2. Description of the Prior Art

Since registers are lower in access cost than memories, the effective utilization of registers is a key design goal for enhancement of the program processing speed of a processor. However, the number of the registers that can be employed is finite.

Various systems and methods have been devised in an effort to effectively utilize the registers of a register file. For example, the system disclosed in U.S. Pat. No. 4,777,588 allocates a variable number of registers to a particular procedure that is limited to only the number that is actually required by the procedure. In addition, register classes are defined so that communication may occur between multiple procedures via variables stored in a set of "global" registers while variables required for a given procedure are stored in a set of "local" registers. Local registers may be disposed so that a set of registers used by a calling procedure overlap with the set of registers used by the called procedure. This allows convenient passing of parameters from the calling procedure to the called procedure. A stack pointer value stored in one of the register sets defines accesses to the local registers of the set. Adjusting the stack pointer values can produce the overlap so that the procedures can communicate via the registers in common. In a multi-tasking environment, to proscribe access to selected registers containing values set by a task, during the running of other tasks, a protection register is provided which contains data indicating a denial of access to a block of the register file in which the selected registers are included. Accordingly, the system can use the register file to operate on multiple tasks while maintaining the integrity of the variables of each from undesired changes occurring in the others.

A register file comprised of a plurality of register sets made up of a number of local registers is also disclosed in U.S. Pat. No. 4,811,208. At a call instruction, a register set from the file is allocated to the called procedure. At a return instruction, the allocated register set is freed for allocation to another procedure called by a subsequent call instruction. If the register file is depleted, the contents of a register set associated with a previous procedure is saved in the main memory, and that register set is allocated to the current procedure. The contents of the earlier procedure's register set is mapped into a stack frame. Unfortunately, there is no teaching or reference to a mechanism for especially storing the registers. Neither the timing of the storing or whether or how to restore is identified.

Problems to be Solved by the Invention

As noted above, a data processing program is usually comprised of a plurality of subprograms or procedures for which register allocation processing is separately performed. During the execution of the program, registers that are already being used must be allocated for use for different purposes. Therefore, the contents of those registers needs to be temporarily saved in a main memory and thereafter restored. The save and restore of the register contents in and from the main memory form an undesirable overhead in the utilization of the registers. A reduction in the number of occurrences of these operations is an important design goal and theme for the effective utilization of the registers.

Those prior known computer systems and execution methods which have employed register sets in a register file have suffered from the problems of being unable to particularly identify (1) when a specific register of a register set in use actually needs to have its contents saved for another purpose, or (2) when the saved value actually becomes necessary to be restored. An entire register set of the file may be saved and restored in which many of the registers do not actually need saving and restoring. Accordingly, the number of occurrences of saving and restoring register contents cannot be reduced to the minimal number that is necessary.

Brief Summary of the Invention

In accordance with the present invention a computer system is provided including a main memory and a central processing unit. The central processing unit includes a register file having a plurality of register units. Each register unit comprises a plurality of registers including (1) a register protection flag for indicating an actual use status of the particular register unit, (2) a save area pointer for appointing a save area in the main memory for saving the values of the registers, and (3) a plurality of general purpose registers for holding the values.

In accordance with the method of the invention, the register protection flag of the register unit is checked. If the particular register unit is in use, the values of registers being in use and constituting the register unit are saved in that area of the main memory to which the save area pointer of the register unit points. A register save instruction for such operations is provided.

The register protection flag of the designated register unit is set, and the save area pointer which points to the area of the main memory for saving the register values are set. A register lock instruction for such operations is provided.

In order to restore, if the values of the designated register unit have been saved upon checking the register protection flag of the register unit, the values are restored in the register unit from the designated area of the main memory. A register restore instruction for such operations is provided. Further, a register unlock instruction for resetting the register protection flag of the designated register unit is provided.

In addition, the register save instruction and the register lock instruction may be formed of a single instruction.

The save area is set in a stack frame which is appointed by a frame pointer and a stack pointer. At the start of the processing of a program, the stack frame of predetermined size is secured, and at the end of the processing, the stack frame having been used is released.

An object of the present invention is to provide a register saving and restoring method which reduces the number of occurrences of saving and restoring register contents during the execution of a program and a processing system therefor.

Other objects of the present invention will become apparent from this specification when read in conjunction with the accompanying drawings.

BRIEF DESCRIPTION OF THE DRAWINGS

FIG. 4 is a table showing a list of register operations;

DETAILED DESCRIPTION OF THE PREFERRED EMBODIMENTS

Figure 1:
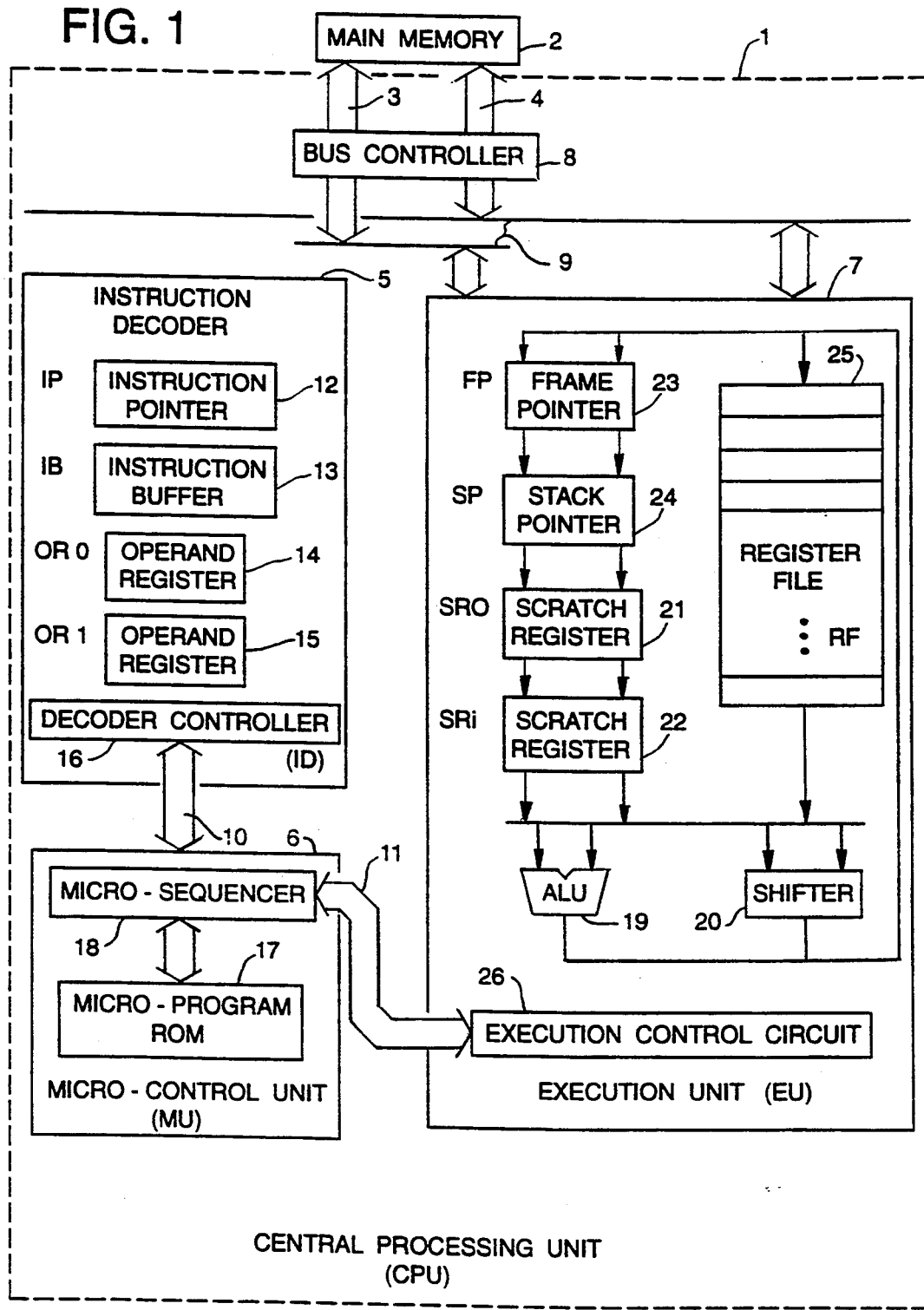
FIG. 1 is a block diagram of a computer system made according to the present invention.

Referring now to the drawings wherein the showings are for purposes of illustrating preferred embodiments of the invention only and not for purposes of limitation thereto, the FIGURES show a data processing system and method in which a central processing unit has a register file whose contents are saved and restored in and from a main memory only a minimal number of times for improved program processing Speed.

More particularly, FIG. 1 shows a block diagram of a computer system made in accordance with the present invention. The computer system is comprised of a central processing unit (CPU) 1, a main memory 2, and an address bus 3 and a data bus 4 for connecting them. The CPU 1 includes an instruction decoder (ID) 5, a microcontrol unit (MU) 6, an execution unit (EU) 7, a bus controller 8, and two internal buses 9, a microcontrol bus 10 and a microinstruction bus 11 for connecting them.

The instruction decoder (ID) 5 decodes an instruction given to the CPU 1, and controls the execution of the instruction. More specifically, the content (instruction code) of that address of the main memory 2 which is indicated by an instruction pointer (IP) 12 is loaded in an instruction buffer (IB) 13, the operands of the instruction are computed, and the resultant values are set in operand registers (OR0) 14 and (OR1) 15. Further, the ID 5 instructs the MU 6 through the microcontrol bus 10 to start a microprogram sequence corresponding to the instruction code. The ID 5 includes a decoder controller 16 which executes the above control.

The microcontrol unit (MU) 6 controls the sequence of the executions of microinstructions, such as branch, recursion and end, in a microprogram. The MU 6 includes a microprogram ROM 17 which holds the microprogram sequence corresponding to the instruction, and a microsequencer 18 which is a control circuit. In addition, the microinstructions to be executed are given to the EU 7 through the microinstruction bus 11.

The execution unit (EU) 7 executes the microinstructions provided by the MU6. The EU 7 includes an arithmetic and logic unit (ALU) 19, a shifter 20, scratch registers (SR0) 21 and (SR1) 22 which the microinstructions use, a frame pointer (FP) 23 and a stack pointer (SP) 24 which manage a stack area in the main memory 2, a register file (RF) 25 to which the instruction can directly refer, and an execution control circuit 26 which controls them. The registers in the EU 7 and the ID 5 can transfer data through the two internal data buses 9. Also, these registers can transfer data with the main memory 2 through the internal data buses 9 as well as the bus controller 8.

Figure 2:
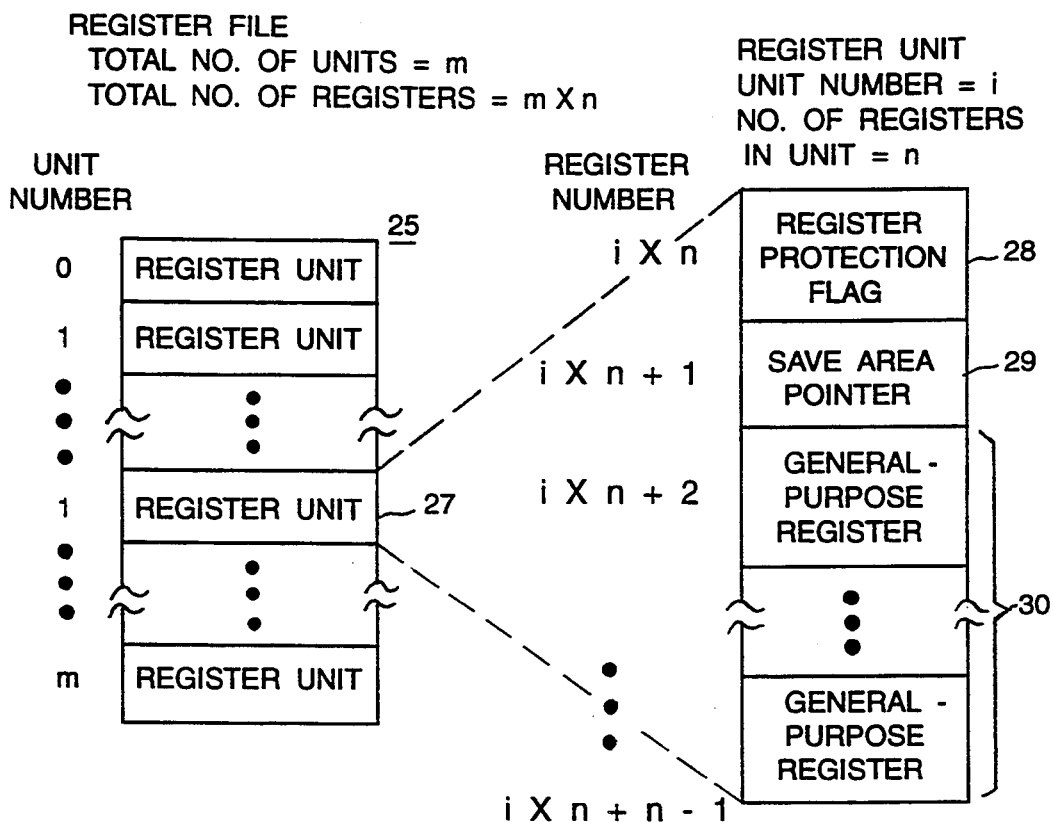
FIG. 2 is a format diagram of a register file made according to the present invention.

FIG. 2 shows the format of a register file (RF) 25.

The register file 25 is comprised of m register units 27, and each unit is comprised of B registers. The bit width of each register is k where $2 < n < k$. The individual registers of each unit have serial register numbers to distinguish them from all the other registers in the file 25. Letting i denote the identity number of any of the register units 27 in the register file 25, the registers included in each unit can be identified by a number from the computations: $[i \times n]$ to $[(i \times n)+(n-1)]$.

Among the n registers in each register unit, one is a register protection flag 28 which indicates the actual use of the registers of the particular register unit, and another register is a save area pointer 29 which holds the head address position of a register unit save area in the main memory 2. In this embodiment, the register protection flag 28 is set to be the first register of each unit (that is, the register having register number $(i \times n)$ where i denotes the register unit number), while the save area pointer 29 is set to be the second register of each unit (that is the register having register number $(i \times n+1)$). The other registers 30 of the unit 27 are employed as general-purpose registers.

Figure 3:
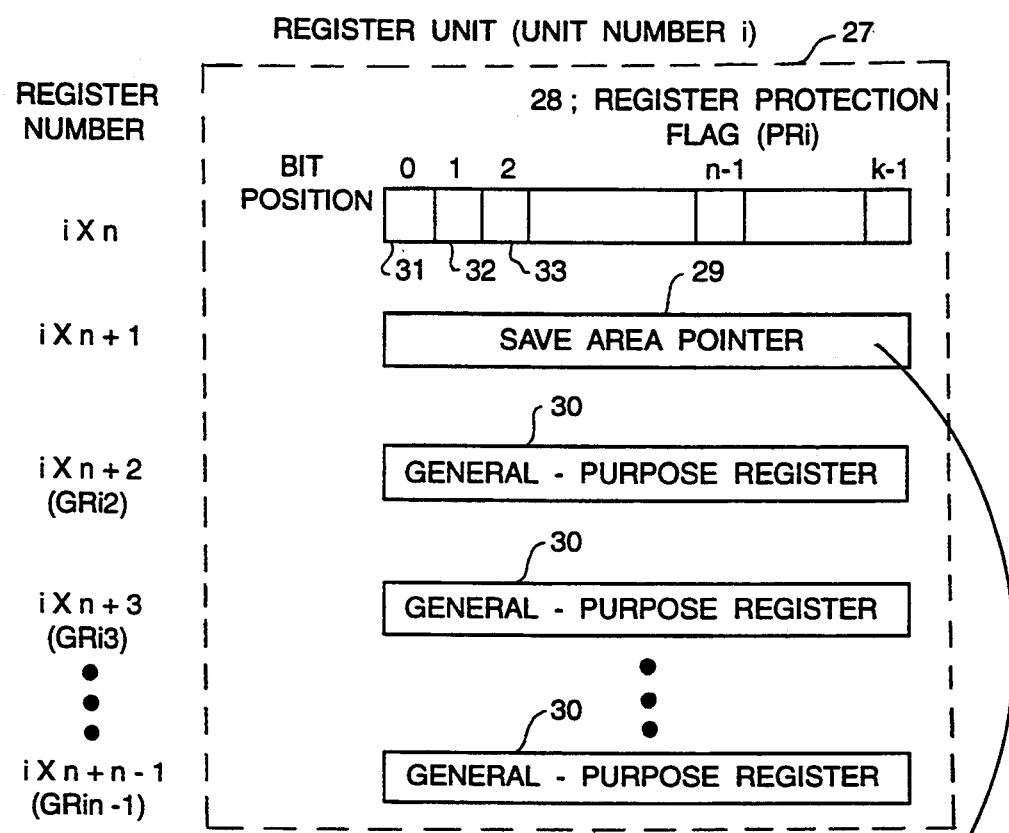
FIG. 3 is a format diagram of a register unit in the register file made according to the present invention.

FIG. 3 is a diagram showing the format of the register unit 27 of the present invention.

The register protection flag 28 of each unit includes a flag 31 identifying the actual use of the whole register unit 27, a flag 32 identifying the actual use of the save area pointer and flags 33, . . . which identify the actual situation of use of the individual general purpose registers 30 within the unit. Here, the most significant bit ("MSB", bit position 0) of the register protection flag 28 indicates the situation of use of the whole register unit (indicates "being used" with '1'). The second bit (bit position 1) indicates the situation of use of the save area pointer. The third bit, et seq., (bit position 2, etc.) indicate if the general purpose registers 30 are in use. For example, the j-th bit of the register protection flag 28 would be a flag for register number $(i \times n+j)$ where i denotes the register unit number. Here, the 0-th bit serves also to indicate if the register protection flag 28 itself is in use. Thus, all the general purpose registers 30 of each unit are free to be used in the execution of a program but only those that are actually used can be identified by the register protection flag as being in use.

The identification "(GRi2)" used in the FIG. indicates that the number 2 register in the i unit is a general purpose register.

FIG. 4 shows a list of register operations made in accordance with the present invention.

These register operations are stored in the ROM 17 as microprograms, and they are read out by the microsequencer 18 and are executed by the execution control circuit 26.

Each of the listed register operations will be described in detail.

(1) Register unit save instruction (SAVE):

The first operand is the number (i) of the register unit to be saved. The instruction decoder (ID) 5 calculates the register numbers of the register protection flag 28 and save area pointer 29 of the corresponding unit on the basis of the first operand (the first operand×n and the first operand×n+1, respectively). It sets the respective results in the operand registers OR0 14 and OR1 15 (FIG. 1) and starts the microprogram by which the contents of the registers of the unit are saved in the area of the main memory 2 designated by the save area pointer 29.

Figure 5:
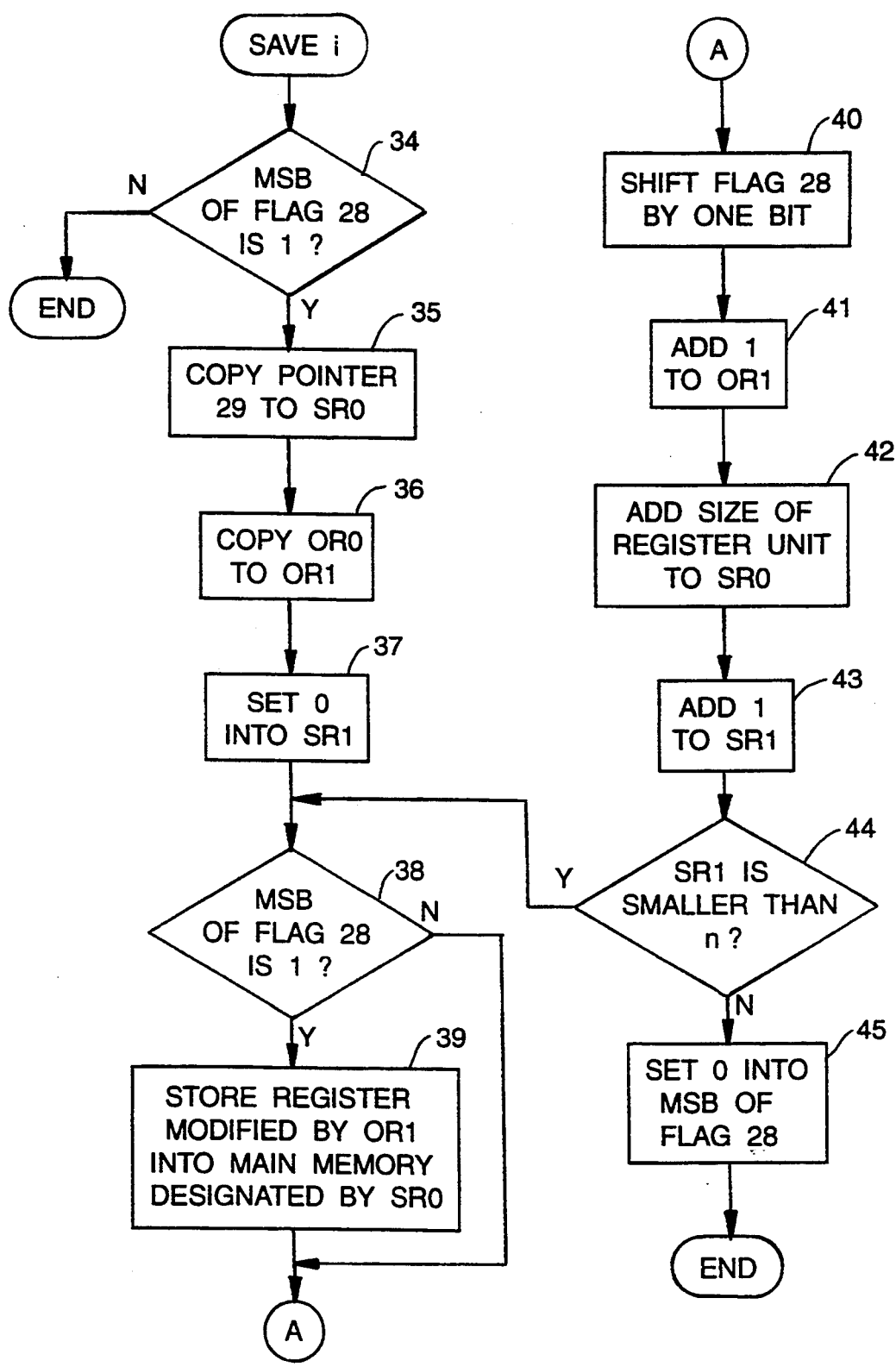
FIG. 5 is a flow chart of a microprogram of a register save instruction.

A more detailed example of the processing steps for a SAVE instruction execution is shown in the flow chart of FIG. 5.

Step 34: The MSB of the register protection flag 28 is checked. If it is '0', the microprogram is ended (the register number of the register protection flag 28 is held by the operand register OR0 14).

Step 35: The content of the save area pointer 29 is copied in the scratch register SR0 21 (the register number of the save area pointer 29 is held in the operand register OR1 15).

Step 36: The content of the operand register OR0 14 is copied in the operand register OR1 15.

Step 37: '0' is set in the scratch register SR1 22.

Steps 38 and 39: The MSB of the register protection flag 28 is checked, and if it is '1', the content of the register whose number is the content of the register OR1 15 is stored in the area of the main memory 2 designated by the register SR0 21.

Step 40: The register protection flag 28 is shifted leftward by 1 bit.

Step 41: A '1' is added to the content of the register OR1 15.

Step 42: A main memory area size corresponding to one register is added to the content of the register SR0 21.

Step 43: A '1' is added to the content of the register SR1 22.

Step 44: If the content of the register SR1 22 is less than n ((SR1)<n), the processing flow returns to the step 38.

Step 45: A '0' is set in the MSB of the register protection flag 28.

Thus, the execution of the microprogram is ended.

Alternatively, in the above flow, the steps 36 and 37 and the steps 40 through 43 may well have their orders changed, respectively.

It is a feature of the invention that in the execution of the SAVE instruction, only those registers in the register unit that are in actual use are stored in the main memory. More particularly, since a register's actual use is designated by the corresponding bit in the protection register flag, when the bit is "0", the storage to main memory step 39 will be bypassed. All of the bits of the register protection flag are checked through the shift operation of step 40, but only when a bit is a "1" will a storage to main memory occur. This provides a substantial increase in processing speed over those prior art systems which need to store all the registers of a register unit in the main memory because they do not have the ability to determine which registers are in actual use and therefore need to be stored.

(2) Register lock instruction (LOCK):

The first operand in this instruction is the number of any register unit to be used, while the second operand is the head address of a save area in the main memory 2. Here, the save area is assumed to lie within a stack frame based on the frame pointer (FP) 23. However, it may well be a different area which is appointed by another usable register.

The ID 5 calculates the register number of the register protection flag 28 of the corresponding unit on the basis of the first operand, and sets the result in the operand register OR0 14. Also, it calculates the head address of the save area in the main memory 2 on the basis of the second operand and sets the result in the register OR1 15. Further, it sets "1's" in all the bits of the register protection flag 28. Lastly, it copies the content of the register OR1 15 in the save area pointer 29.

Figure 6:
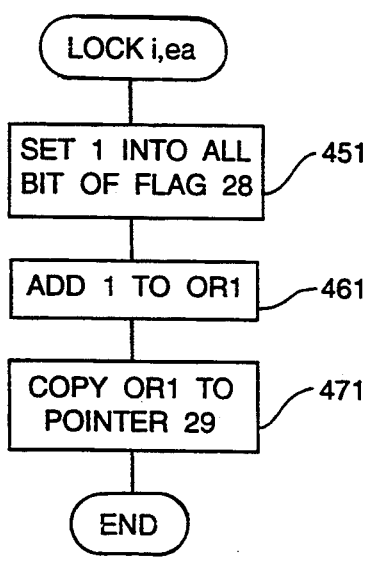
FIG. 6 is a flow chart of a microprogram of a register lock instruction.

FIG. 6 is a flow chart illustrating how the instruction LOCK is executed by the microprogram.

Step 451: "1's" are set in all the bits of the register protection flag 28 (the register number of the register protection flag 28 is held in the OR0 14).

Step 461: A "1" is added to the content of the OR0 14.

Step 471: The content of the OR1 15 is copied in the save area pointer 29 (the register number of the save area pointer 29 is held in the OR0 14).

(3) Register restore instruction (RESTORE):

The first operand of the RESTORE instruction is the number of any register unit to be used, while the second operand is the head address of that area of the main memory 2 in which the contents of the pertinent registers to be restored are saved.

The ID 5 calculates the register number of the register protection flag 28 of the corresponding unit on the basis of the first operand, and sets the result in the operand register OR0 14. Also, on the basis of the second operand, it sets the head address of the area of the main memory 2 storing the contents to be restored, in the operand register OR1 15. Subsequently, it checks the MSB of the register protection flag 28 for the register unit to be used and if it is "0", it restores the contents of the registers following the register protection flag 28 as well as the save area pointer 29, from the main memory 2.

Figure 7:
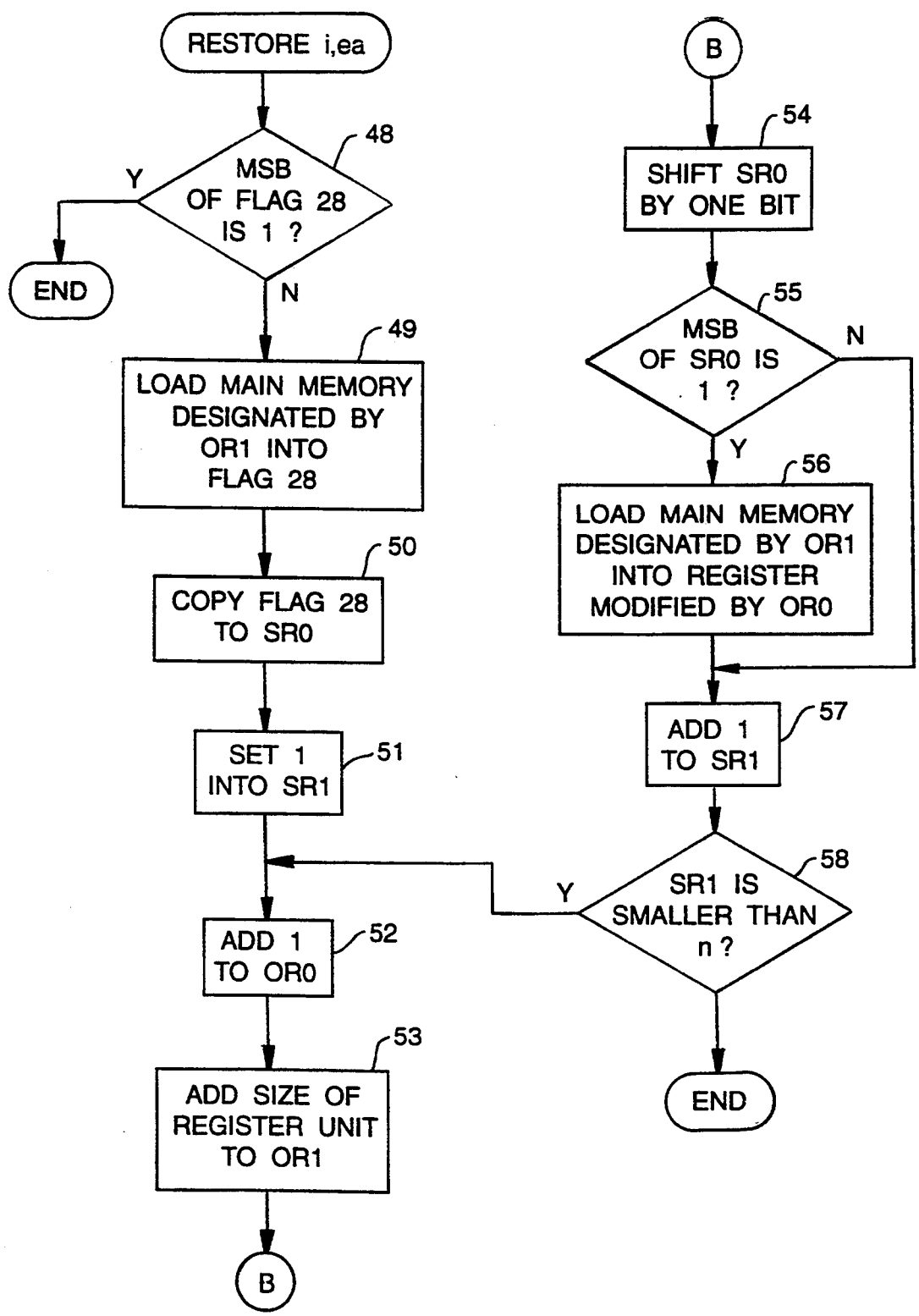
FIG. 7 is a flow chart of a microprogram of a register restore instruction.

An example of a microprogram for executing the instruction RESTORE is shown as a flow chart in FIG. 7.

Step 48: The value of the MSB bit of the register protection flag 28 is checked If it is "1", the microprogram is ended (the register number of the register protection flag 28 is held in the OR0 14).

Step 49: The content of the main memory 2 indicated by the OR1 15 is loaded in the register protection flag 28.

Step 50: The content of the register protection flag 28 is copied in the scratch register SR0 21.

Step 51: A "1" is set in the scratch register SR1 22.

Step 52: "1" is added to the content of the OR0 14.

Step 53: The main memory area size corresponding to one register is added to the content of the OR1 15.

Step 54: The content of the SR0 21 is shifted leftward by 1 bit.

Steps 55 and 56: The MSB of the content of the SR0 21 is checked, and if it is a "1", the content of the main memory 2 designated by the OR1 15 is copied in the register appointed by the OR0 14.

Step 57: A "1" is added to the content of the SR1 22.

Step 58: If the content of the SR1 22 is less than n, the processing flow returns to the step 52.

Thus, the execution of the microprogram is ended. Alternatively, in the above procedure of steps, the steps 52–54 may well have their order changed.

Similarly as in the SAVE instruction, the RESTORE instruction only restores the registers that are in actual use and need to be restored. The register protection flag which is first restored from the memory indicates only those registers which need to be restored by the corresponding flag bit comprising a "1". Again, this provides a substantial increase in processing speed over those systems which can only restore the entire set of registers in the register unit from the memory.

(4) Register unlock instruction (UNLOCK):

The first operand is the number of any register unit to be saved.

Figure 8:
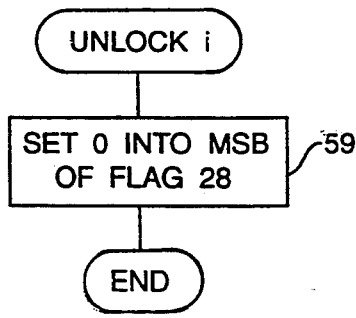
FIG. 8 is a flow chart of a microprogram of a register unlock instruction.

The ID 5 calculates the register number of the register protection flag 28 of the particular register unit on the basis of the first operand, and sets the result in the operand register OR0 14. In the microinstruction of the corresponding microprogram, a "0" is set in the MSB of the register protection flag 28 (step 59 in FIG. 8).

Figure 9:
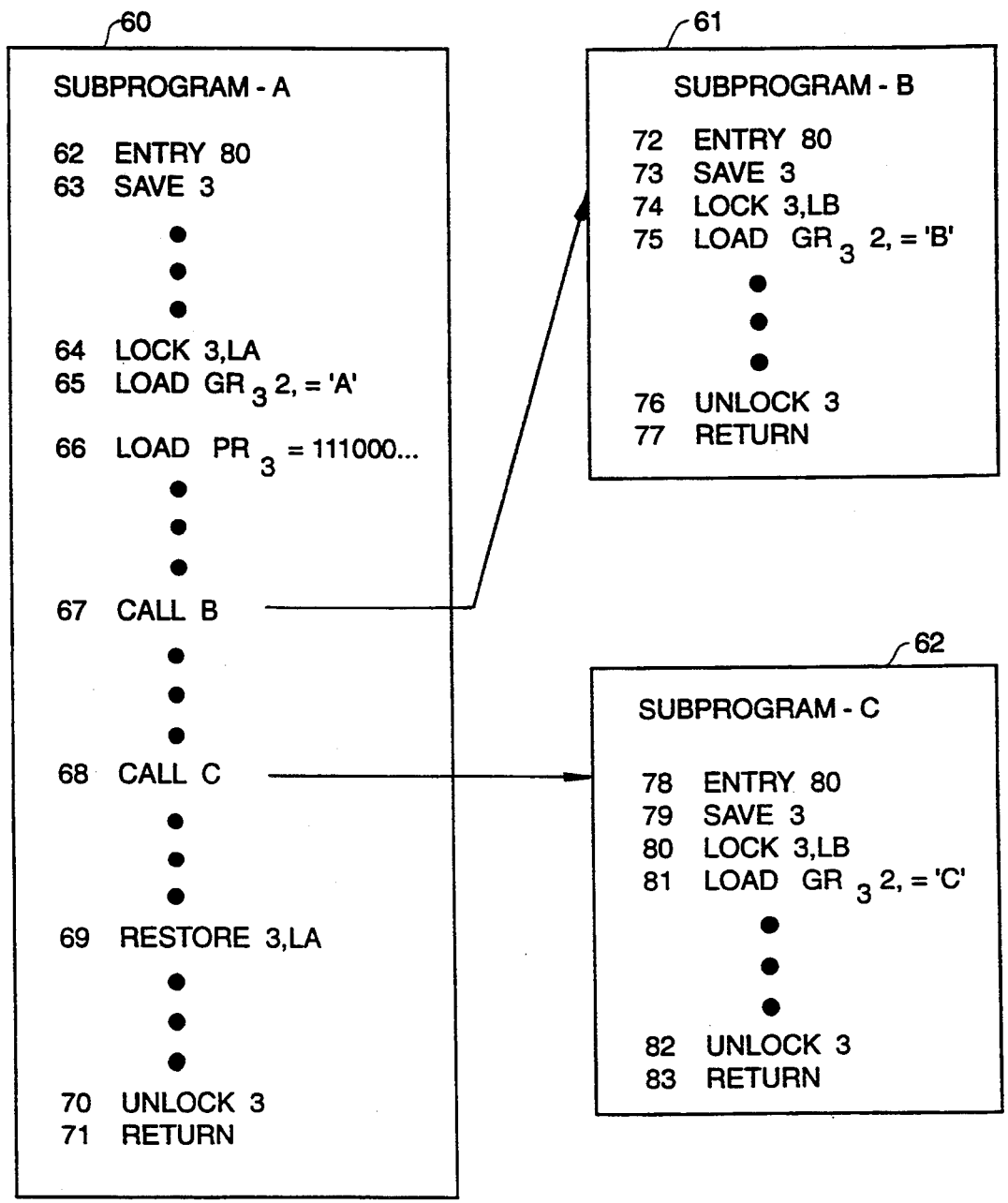
FIG. 9 is a diagram showing an embodiment of a program which employs the register operations.

FIG. 9 shows an embodiment of a program which employs the register operations stated above.

This embodiment illustrates a case where a SUBPROGRAM-A 60 calls a SUBPROGRAM-B 61 and a SUBPROGRAM-C 62 which use the same register unit (unit number "3").

The respective SUBPROGRAMs have data areas each of which is used for holding the interim result of a computation, saving the contents of registers, etc., in correspondence with the individual SUBPROGRAMs within the main memory 2. Each of the data areas shall be termed a "stack frame". During the execution of each SUBPROGRAM, the stack frame is designated by the two registers of the frame pointer 23 (FP which holds the head address of the stack frame) and the stack pointer 24 (SP which indicates the tail address of the stack frame and which holds the head address of a stack frame to be subsequently secured).

In addition, each Subprogram secures a stack frame of size necessary for its processing anew when starting the processing, and it releases the used stack frame when ending the processing.

The following comprises an explanation of a call instruction, a return instruction, a stack activate instruction and a load instruction which are used in the program of this embodiment.

Call instruction (CALL): This is, for example, an instruction indicated at the sentence 67 of the SUBPROGRAM-A. The first operand appoints the entry point of the SUBPROGRAM of a called destination. The contents of the frame pointer FP 23 and instruction pointer IP 12 are saved in the position (address) of the main memory 2 specified by the stack pointer SP 24. The content of the stack pointer SP 24 is copied in the frame pointer FP 23. The content of the instruction pointer IP 12 is altered to the entry point appointed by the first operand (as a result, the execution of the SUBPROGRAM designated by the first operand is started).

Return instruction (RETURN): This is, for example, an instruction indicated at the sentence No. 71 of the SUBPROGRAM-A. It has no operand. The content of the frame pointer FP 23 is copied in the stack pointer SP 24. The contents of the frame pointer FP 23 and instruction pointer IP 12 are restored from the position of the main memory 2 appointed by the stack pointer SP 24 (as a result, the execution of the SUBPROGRAM of a calling source is restarted).

Stack activate instruction (ENTRY): This is, for example, an instruction indicated at the sentence 63 of the SUBPROGRAM-A. The first operand specifies the size of a stack frame. The value indicated by the first operand is added to the content of the stack pointer SP 24.

Load instruction (LOAD): This is, for example, an instruction indicated at the sentence 66 of the SUBPROGRAM-A. The first operand is a register number. The second operand specifies a set value. The value specified by the second operand is set in the register of the first operand.

The register saving and restoring operations of the present invention are described in detail with reference to FIGS. 9–13.

In the SUBPROGRAM-A 60, a stack frame is first generated by the stack activate instruction (step 62), and saving the content of the register unit 3 is instructed (step 63). The start of the use of the register unit 3 is instructed at a certain point of time of the program (step 64). Here, it is assumed that the save area (LA) lies within the current stack frame. Subsequently, a value "A" is set in one register (GR32) included in the register unit 3 (step 65). The protection register flag for unit 3 is then loaded with the proper code indicating that the "2" register is in actual use, that is, 111000 ... (step 66).

Figure 10:
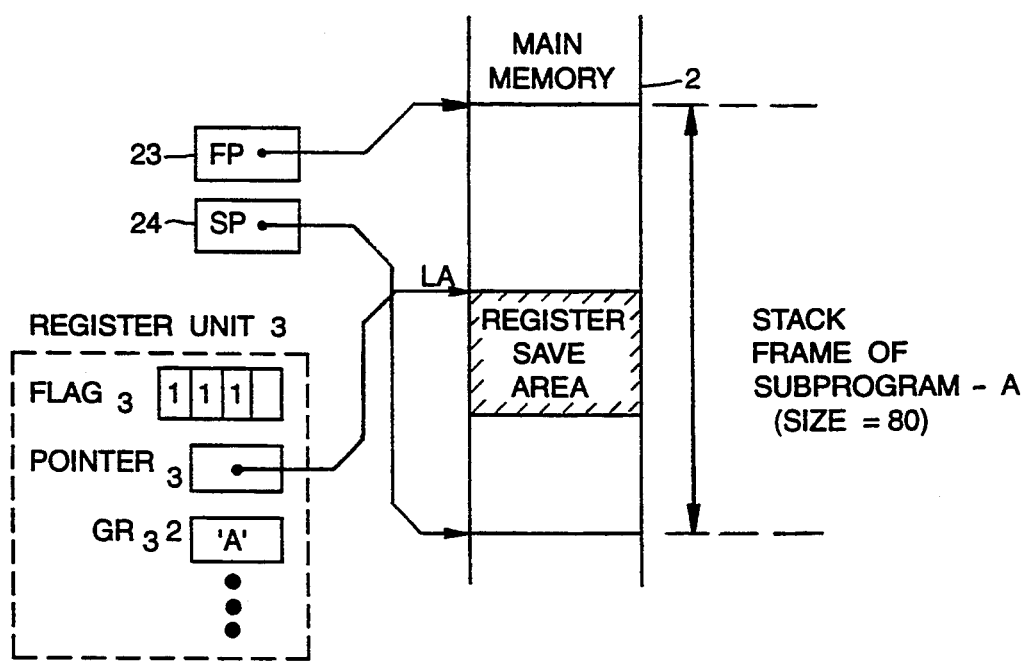
FIGS. 10-13 are illustrative diagrams each showing the status of a main memory and a register unit at different times during the running of the program of FIG. 9; and, FIG. 14 is an illustrative diagram similar to FIG. 9 showing an example of a program in accordance with a prior art method.

FIG. 10 shows the status of the main memory 2 and the registers at this point of time.

Thereafter, the SUBPROGRAM-B 61 is called (step 67).

Figure 11:
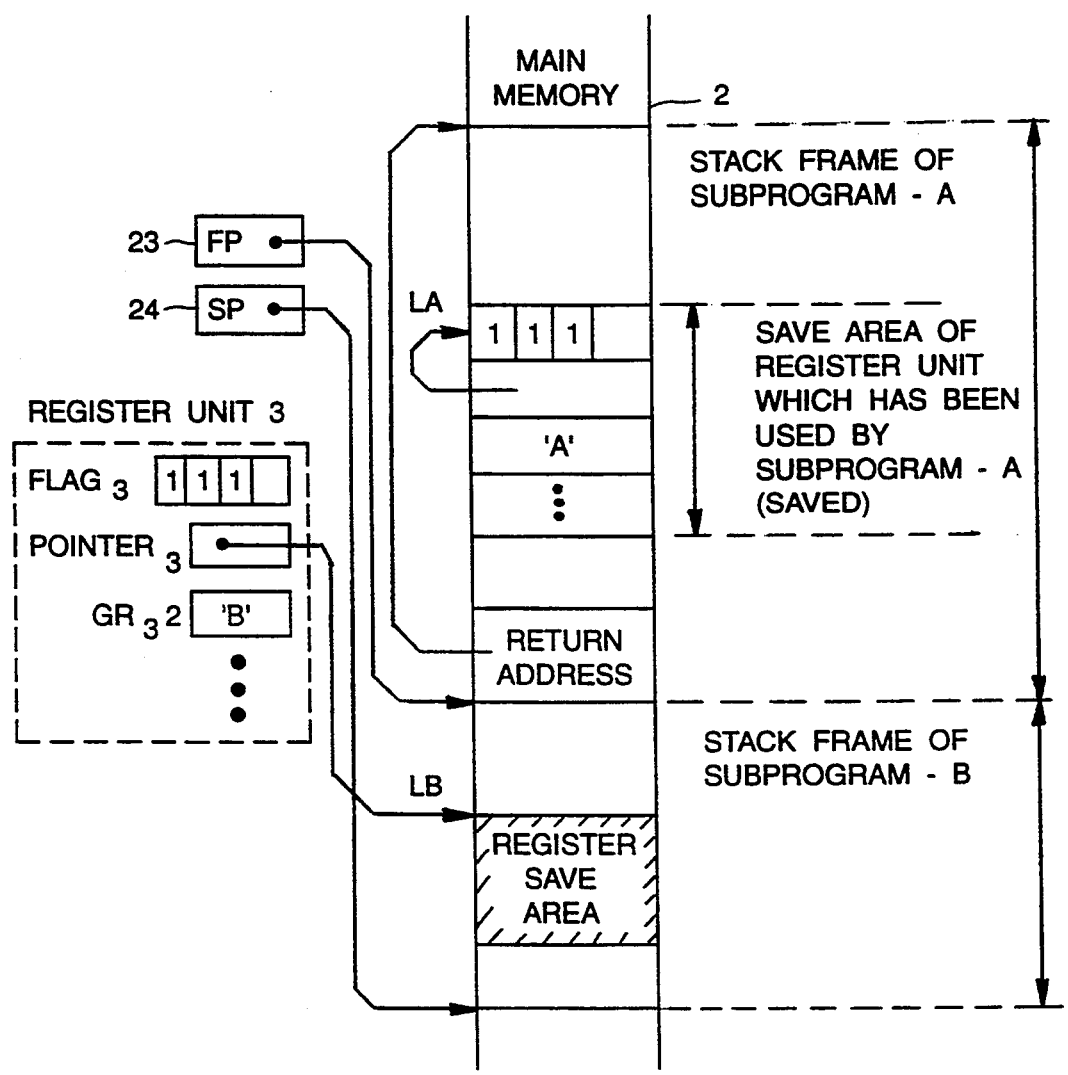

In the SUBPROGRAM-B 61, a stack frame is generated (step 72), and saving the content of the register unit 3 is instructed (step 73). On this occasion, when the SUBPROGRAM-B 61 has been called by the call instruction 67 from the foregoing SUBPROGRAM-A 60, the "used/unused" flag 31 of the register protection flag 28 set by the lock instruction 65 is "1", and hence, the contents of the registers of the register unit 3 are saved in the area LA. Further, in the SUBPROGRAM-B 61, the register unit 3 is used at steps 74 and 75. FIG. 11 shows the status of the main memory 2 and the registers as assumed immediately after the execution of the load instruction 75. The use of the register unit 3 is ended (step 76) immediately before a return to the calling source (step 77).

Figure 12:
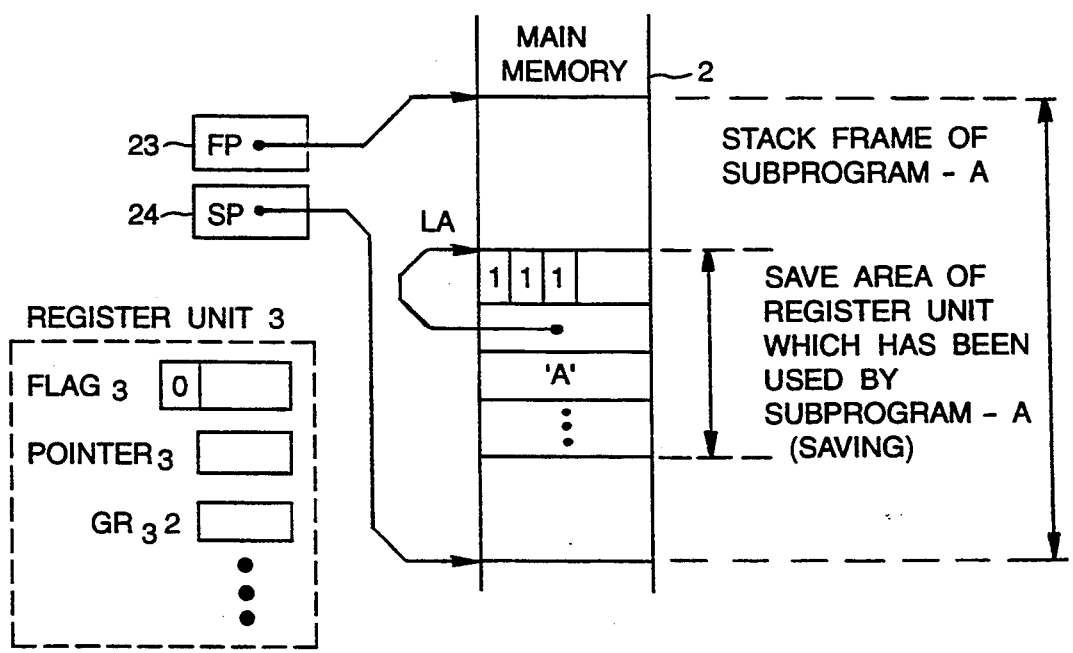

After having called the SUBPROGRAM-B 61, the SUBPROGRAM-A 60 further calls the SUBPROGRAM-C 62 (step 68). FIG. 12 shows the status of the main memory 2 and the registers as assumed immediately before the call of the SUBPROGRAM-C 62.

Figure 13:
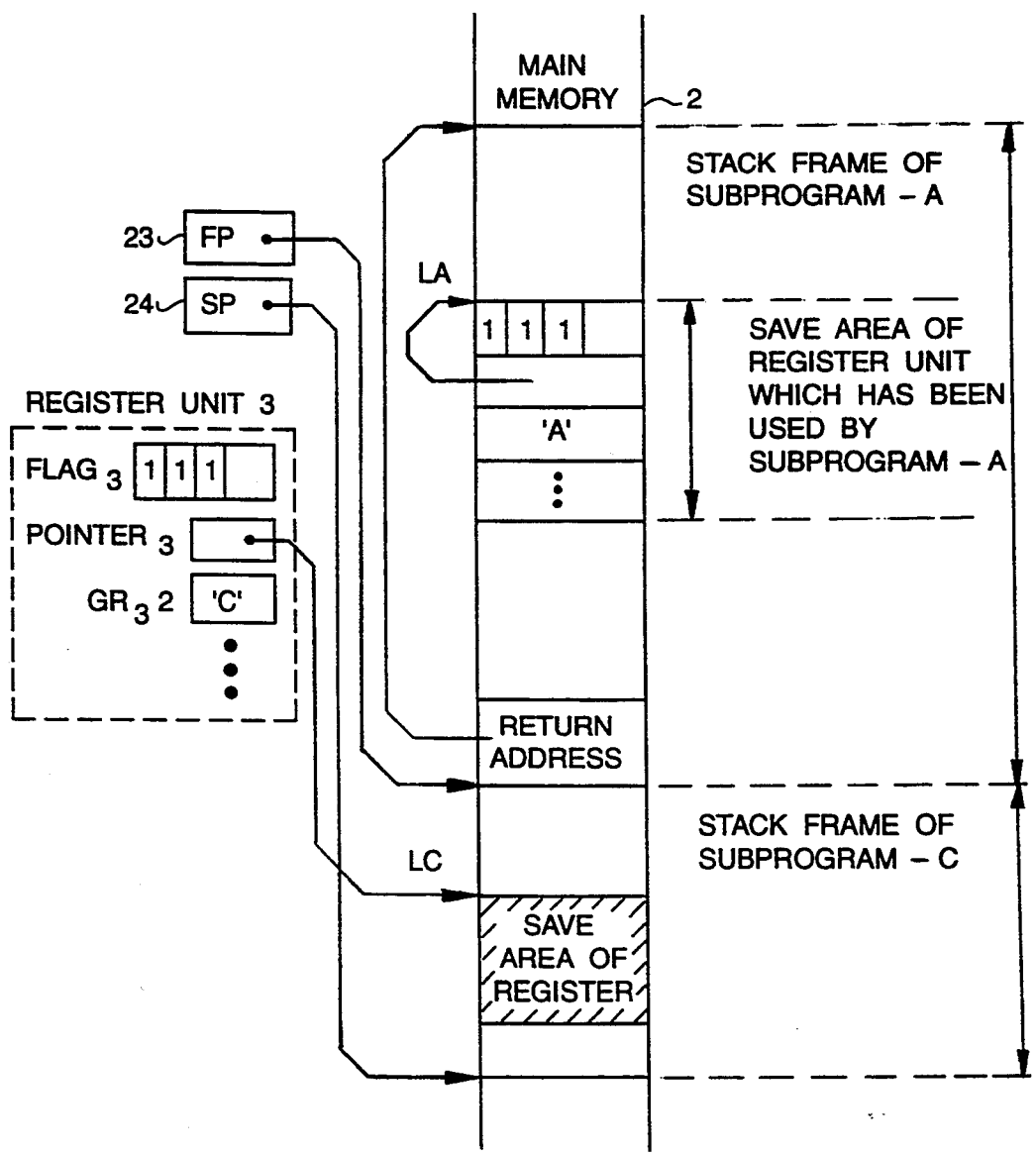

In the SUBPROGRAM-C 62, a stack frame is secured (step 78), and saving the content of the register unit 3 is thereafter instructed (step 79). Here, in a case where the call of the SUBPROGRAM-C 62 is later than that of the SUBPROGRAM-B 61 and where the content of the register unit 3 is not restored before the call of the SUBPROGRAM-C 62, the MSB 31 of the register protection flag 28 remains at "0", and hence, the content of the register unit 3 is not saved in the main memory 2 again. Further, in the SUBPROGRAM-C 62, the register unit 3 is used, and the processing of the program returns to the calling source (steps 80–83). FIG. 13 shows the status of the main memory 2 and the registers as assumed immediately after the execution of the load instruction 81.

After having called the SUBPROGRAM-C 62, the SUBPROGRAM-A 60 instructs restoring the content of the register unit 3 (step 69). Here, the content of the register unit 3 used by the SUBPROGRAM-A 60 has been saved at the call of the SUBPROGRAM-B 61, and the register unit 3 is in the unused status, so that the content of the register unit 3 is restored from the area LA in the main memory 2. Further, in the SUBPROGRAM-A 60, the use of the register unit 3 is ended (step 70) immediately before the return to the calling source (step 71).

It is a feature of the invention that in the foregoing example the register unit 3 contents were only saved and restored when it was actually necessary to do so.

Figure 14:
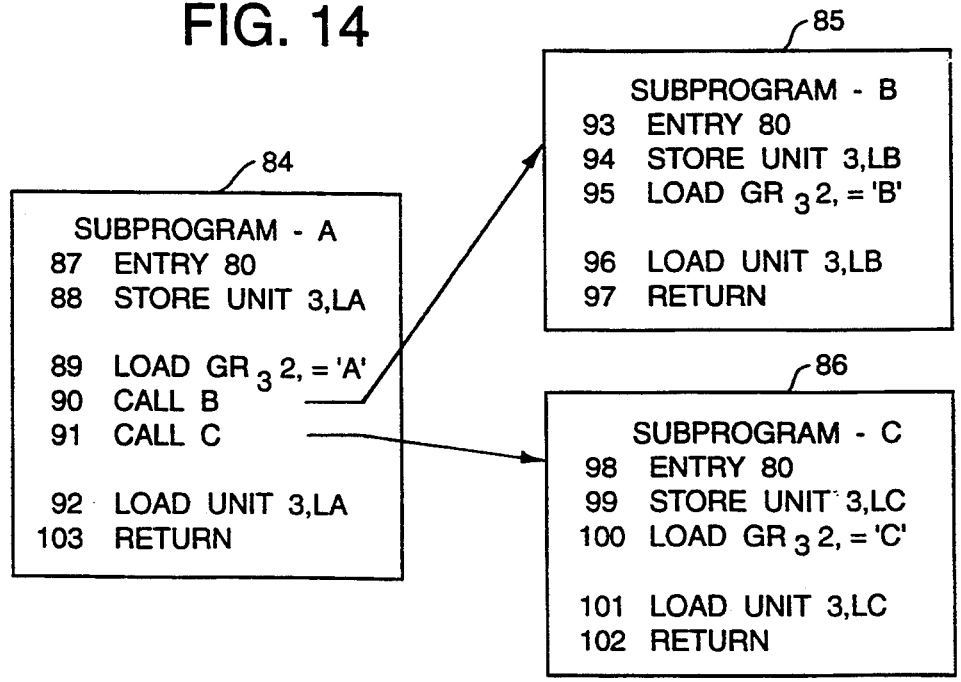

FIG. 14 describes the program of FIG. 9 in a manner as at may be used by a register saving method of the prior art. (Here, which registers the respective SUBPROGRAMs are using is assumed to be unknown when the SUBPROGRAMs are generated.)

In the respective SUBPROGRAMs, stack frames are secured (steps 87, 93 and 98), and the registers (register units) to be used in the SUBPROGRAMs are saved (steps 88, 94 and 99). Also, when the respective SUBPROGRAMs are ended, the contents of the above registers are restored (steps 92, 96 and 101).

The point of emphasis is that the operations of saving and restoring the register (unit) content occur once at each of the call of the SUBPROGRAM-B 85 (step 90) and the call of the SUBPROGRAM-C 86 (step 91) from the SUBPROGRAM-A 84, and they occur twice in total in executing the program (steps 94, 96, 99 and 101).

In contrast, according to the register saving and restoring method of the present invention, the register unit content may be saved only once at the instruction SAVE (step 73) in the call of the SUBPROGRAM-B 61 as shown above (the restoring operation occurs at the instruction RESTORE (step 69) in the SUBPROGRAM-A 60). There was no need to save anything from the register unit from the SUBPROGRAM-B at the call of SUBPROGRAM-C.

Also, the register protection flag 28 in the present invention is provided with the flags 32, 33, .... which indicate the situations of actual use of the individual registers in each register unit. As noted above, it is therefore possible to reduce the number of times of saving and restoring register contents still more in such a way that, as to the registers whose contents need not be saved, the corresponding flags of the register protection flag are reset to "0"s by other instructions in a program.

Moreover, the method of the present invention is applicable to the control of excluding register contents among tasks in a multi-task environment in such a way that the register save instruction and the register lock instruction are integrated into a single instruction which executes register save processing and subsequently register lock processing.

According to the register saving and restoring method of the present invention, the actual use of registers can be determined during the execution of a program. The invention therefore brings forth the effect that wasteful operations of saving and restoring register contents are dispensed with, so the number of times of the operations of saving and restoring register contents is sharply reduced.

The invention has been described with reference to preferred and alternative embodiments. Modifications and alterations will occur to others upon the reading and understanding of this specification. It is our intention to include all such modifications and alterations insofar as they come within the scope of the appended claims and the equivalents thereof.

What is claimed is:

1. A method for saving and restoring contents of a plurality of first registers being used in a plurality of register units between a main memory and a central processing unit, and bypassing for either saving and restoring a plurality of second registers not being used in the plurality of register units, comprising the steps of:
   when register save instruction is issued, checking a register protection flag of a designated one register unit, wherein the register protection flag includes a plurality of bits for identifying the plurality of first registers and the plurality of second registers and if the flag is set to designate that the one register unit is being used, selectively saving only the contents of a first set of the registers in the designated one register unit identified as being used by the register protection flag in an area of said main memory appointed by a save area pointer of said designated one register unit and bypassing a second set of registers in the designated one register unit identified as not being used by the register protection flag wherein the second set of registers are not saved in the memory;
   wherein when a register lock instruction is issued, setting said register protection flag of the designated one register unit, and setting said save area pointer for appointing said area of said main memory in which the contents of the registers being used are to be saved;
   wherein when a register unlock instruction is issued, resetting said register protection flag of the designated one register unit.

2. The register saving and restoring method as defined in claim 1, wherein when a register restore instruction is issued, checking said register protection flag of the designated one register unit, and if the flag has been cleared to designate that the contents of said designated register unit have been saved, restoring the contents of the first set of registers from the area of said main memory into the designated one register unit.

3. The register saving and restoring method as defined in claim 1, wherein said register save instruction and said register lock instruction are formed of a single instruction.

4. A method of saving and restoring contents of registers in a register unit in a register file in a central processing unit to a main memory so that only the contents which are needed for actual use are saved and restored, for minimizing main memory access, wherein the registers include a register protection flag, a save area pointer and a plurality of general purpose registers, wherein the register protection flag includes a plurality of bits identifying which of the plurality of general purpose registers is in actual use, comprising the steps:
   setting the register protection flag to indicate the actual use of the plurality of general purpose registers and to selectively identify a first set of the general purpose registers in the register unit that are in actual use and a second set of the general purpose registers in the register unit that are not in actual use, the actual use comprising a storage of the contents in a one of the general purpose registers;

saving the contents in a save area of the main memory designated by the save area pointer after checking the register protection flag by storing only the first set of general purpose registers identified by the register protection flag to be in actual use, and bypassing the second set of general purpose registers; and restoring the contents from the main memory to the register unit after checking that the register protection flag indicates actual use;

wherein when a register lock instruction is issued, setting said register protection flag of the designated one register unit, and setting said save area pointer for appointing said area of said main memory in which the contents of the registers being used are to be saved;

wherein when a register unlock instruction is issued, resetting said register protection flag of the designated one register unit.

5. The method as defined in claim 4 wherein the saving and restoring comprises saving and restoring the register protection flag, the save area pointer and the general purpose registers having the contents stored therein.

6. The method as defined in claim 4 wherein the register protection flag comprises a plurality of bits having a number greater than the number of registers in the register unit, and wherein the setting comprises setting a corresponding one of the bits for each one of the registers in the register unit having the contents stored therein.

7. The method as defined in claim 6 wherein the checking comprises sequential determination of the bits of the register protection flag and when the corresponding one is determined to indicate no actual use, then bypassing the saving and restoring of the each one of the registers.

8. The method as defined in claim 4 further including unlocking the register unit to set the register protection flag to indicate no actual use of the register unit, thereby to avoid main memory access when the general purpose registers have been used and the contents are not to be stored in the main memory.

* * * * *

UNITED STATES PATENT AND TRADEMARK OFFICE
CERTIFICATE OF CORRECTION

PATENT NO. : 5,414,864
DATED : May 9, 1995
INVENTOR(S) : Shinobu Koizumi

It is certified that error appears in the above-indentified patent and that said Letters Patent is hereby corrected as shown below:

Claim 1, column 10, line 17, after "when" insert --a--.

Signed and Sealed this

Twenty-seventh Day of June, 1995

Attest:

BRUCE LEHMAN

*Attesting Officer*     *Commissioner of Patents and Trademarks*